Oct. 4, 1932.  A. N. BENN  1,880,680
MEAT FORMING CARRIER
Filed Feb. 9, 1931  3 Sheets-Sheet 1
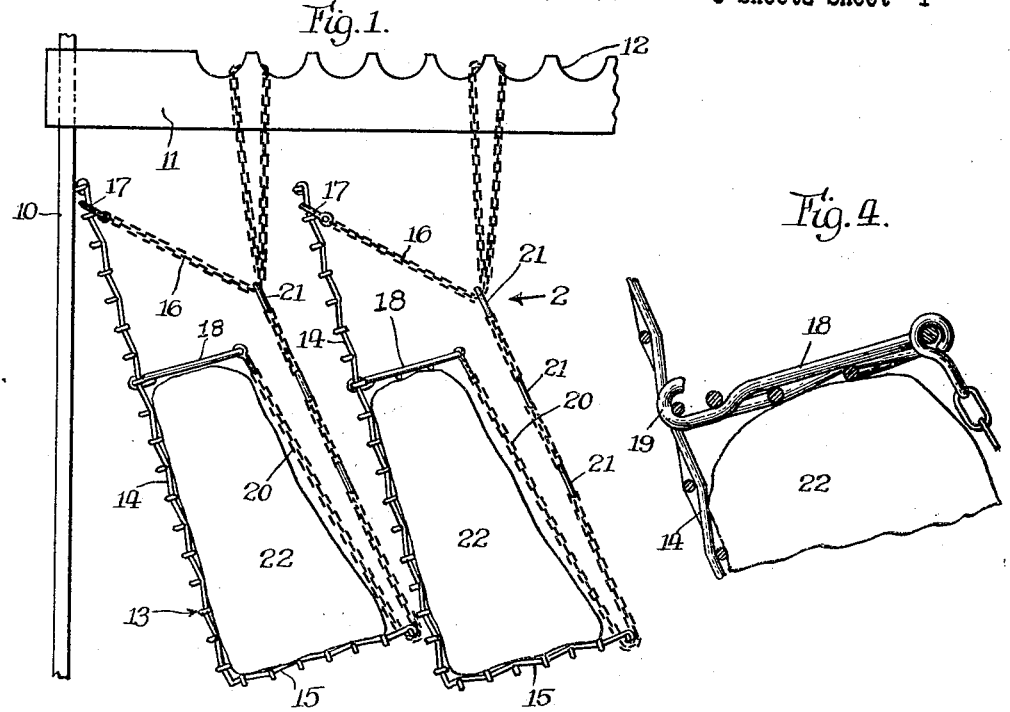
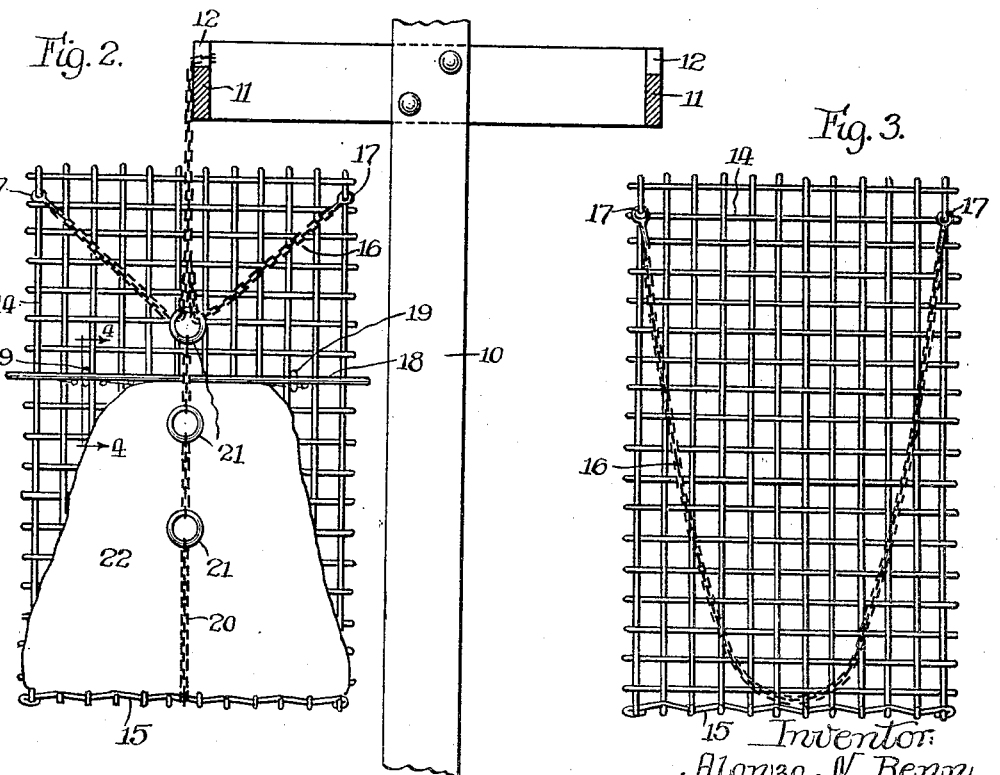

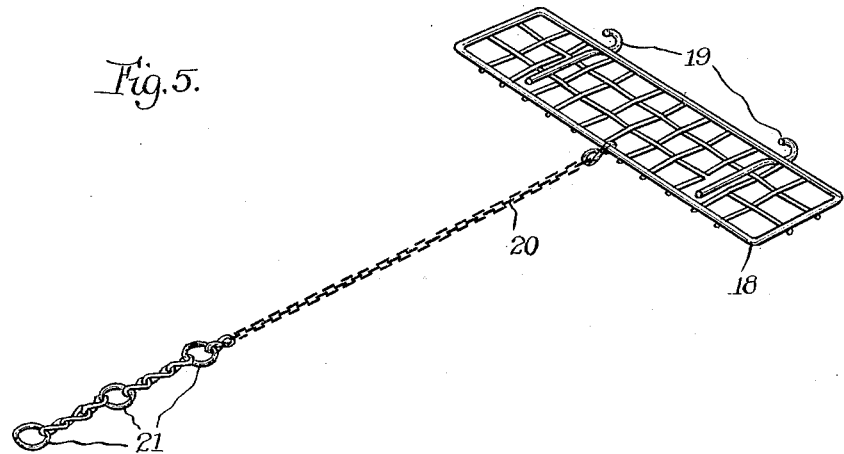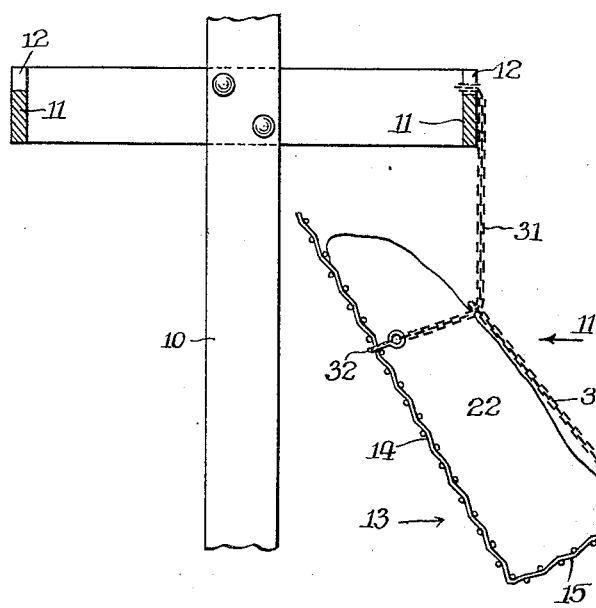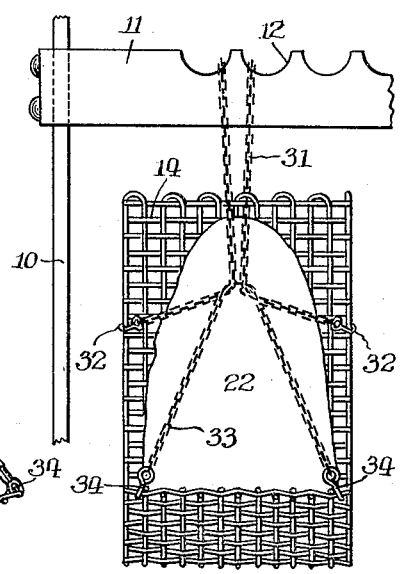

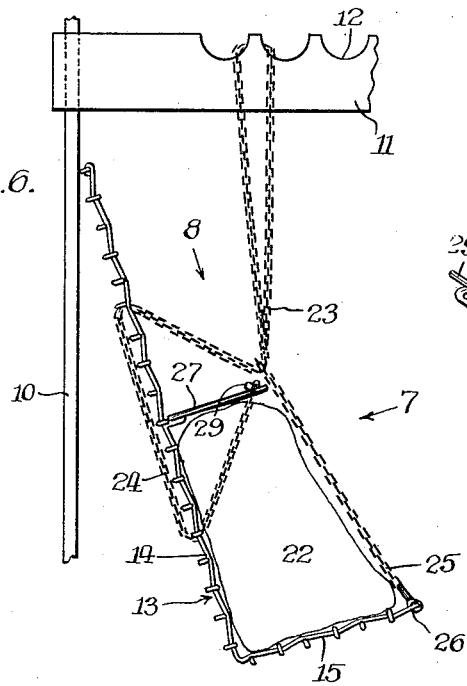
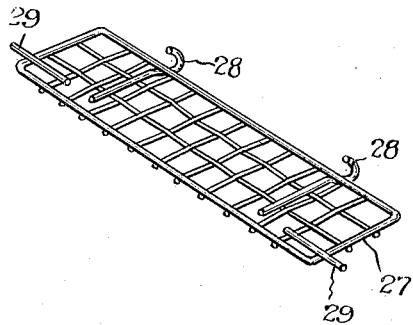
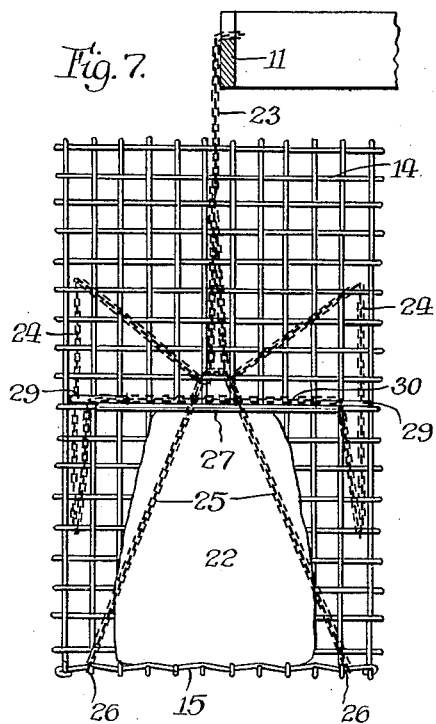
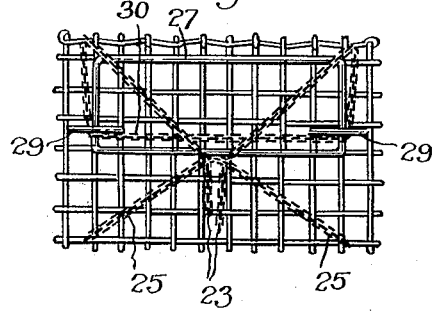

Patented Oct. 4, 1932

1,880,680

UNITED STATES PATENT OFFICE

ALONZO N. BENN, OF CHICAGO, ILLINOIS

MEAT FORMING CARRIER

Application filed February 9, 1931. Serial No. 514,358.

My invention relates to meat forming carriers and is primarily concerned with supports of this nature which are utilized for the smoking of meats which are ordinarily suspended during the smoking operation, although susceptible of adaptation to meats which are supported in other ways.

The principal object of my invention is to devise a carrier for the support of meats during the smoking thereof, particularly pork ham rolls, pork shoulder or pinic rolls, beef insides, outsides and knuckles, and generally meats of all description which have either been completely boned, or from which the major portion of the bone has been removed, and which is arranged to secure a positive, initial shaping of the meat and subsequent control thereof during the smoking process so that the final product presents a more attractive and marketable form.

A further object is to provide a carrier of the foregoing type which includes simple, highly effective, and easily positioned devices for initially constraining the meat into the form desired, particularly a squaring of the ends, and maintaining the indicated shape during the smoking operation, and which is further arranged to permit an intimate contact of the smoke and hot gases with the whole exterior of the meat.

A further object is the employment of carriers in which the meat pieces are pre-shaped and/or retained in position through the medium of presser members and flexible devices, such as chains, the shaping pressure being maintained by suspending the carrier so that the total weight operates through the chains to the presser member.

A further object is to devise a carrier of light construction which is easily and quickly handled under conditions obtaining in plants operating under large production schedules, and which is readily adjustable to accommodate various sizes of meats.

The present invention is intended to overcome the disadvantages now inherent in boned, smoked meats generally, respecting misshapen and ill-shaped ends which are not only highly productive of waste in slicing the same, but which lessen the attractiveness of the meat and therefore affect its marketability. Meats of this character are simply hung from a suitable stick or the rail of a smokehouse trolley, or merely carried in suitable containers or baskets during the smoking operation. Prior to smoking, they have been cured and at this time are so extremely soft and pliable that present-uncontrolled methods of smoking create protruding and irregularly shaped ends which constitute a source of waste and consequently affect the price of the product, since these ends must be removed in the sale of the meat before full, regular slices can be obtained.

It is the express object of the present invention to pre-shape these soft meats by applying a characteristic pressure to certain portions thereof, particularly the ends of the meat piece, and to maintain this pressure during the smoking operation. Briefly, the practice of the invention consists in supporting the meat piece in a substantially L-shaped carrier, with one end of the meat resting on the base thereof, applying a pressure to the opposite end of the meat by a suitable auxiliary device so that the ends of the meat are squared between this device and the base of the carrier. This pressure is preferably applied through the medium of flexible devices such as chains, and the entire assembly is thereafter suspended in such a manner that the combined weight of the carrier and meat effectually maintains the rigor of the compressive force applied to the ends of the meat. The shaping pressure is thus maintained throughout the smoking operation so that the finished product exhibits marked advantages over present similar classes of meat, both from the standpoint of appearance and a substantially absolute avoidance of waste, since the meat may be sliced from the beginning as desired. In addition, meats smoked in my improved carrier are characterized by an entire absence of holes or other distorting effects which are ordinarily created by the action of gravity on soft meats of this nature when simply suspended by supporting strings or hooks. Under certain conditions and with selected types of meat, it is contemplated that the compressive force as applied by the auxiliary device above noted may be dispensed with and the carrier simply suspended with the meat piece resting therein. The meat at this time being soft and pliable, since it has just been delivered from the pickling solution, will, under the action of gravity, have a certain degree of shaping pressure applied to that end thereof which is resting on the base of the carrier.

These and further objects of my invention will be set forth in the following specification, reference being had to the accompanying drawings, and the novel means by which said objects are effectuated will be definitely pointed out in the claims.

In the drawings,—

Figure 1 is a partial elevation of a smokehouse trolley showing two of my improved meat-forming carriers suspended therefrom.

Fig. 2 is a view of one of the carriers, looking in the direction of the arrow 2 in Fig. 1.

Fig. 3 is a view similar to Fig. 2, but showing only the major portion of the carrier as it appears when free from the auxiliary compressing member.

Fig. 4 is an enlarged section along the lines 4—4 in Fig. 2, looking in the direction of the arrows, and showing the manner of detachably connecting the presser member to one side of the carrier.

Fig. 5 is a perspective view of the presser member with its accompanying chain.

Fig. 6 is an elevation similar to that shown in Fig. 1, but showing the modified form of carrier.

Fig. 7 is a view of the carrier shown in Fig. 6, looking in the direction of the arrow 7 in said figure.

Fig. 8 is a plan view of this modified form of carrier, as viewed in the direction of the arrow 8 in Fig. 6, the piece of meat being omitted.

Fig. 9 is a perspective view of the presser member utilized in connection with the form of carrier shown in Fig. 6.

Fig. 10 is an elevation showing still another modification of carrier, as it appears suspended from a smokehouse trolley, the presser member being eliminated with this particular type.

Fig. 11 is a view of the carrier shown in Fig. 10, as viewed in the direction of the arrow 11 in said figure.

Referring to the drawings, and specifically Figs. 1 to 5, inclusive, the numeral 10 designates one of the uprights of a standard form of smokehouse trolley, between which and the opposite upright (not shown) is bridged a horizontal bar 11 which is provided with a plurality of notches 12. The particular portion of smokehouse trolley indicated has been described as merely illustrating a typical support for the meat-forming carrier hereinafter described, but forms no part of the present invention. Other means of support may be adopted as desired.

In the type of support shown, a plurality of meat-forming carriers 13 is suspended therefrom. Each of the carriers comprises a side 14 and a base 15 substantially normally disposed thereto, so that, in section, the carrier presents substantially an L-shaped appearance. The side 14 generally extends in a substantially upright direction when the carrier is suspended, as shown clearly in Fig. 1, and contacts with the side of the piece of meat whose end rests directly on the base 15. The side and base is preferably formed of wire screening or netting having any desired mesh and gauge of wire, but is usually formed of material of this character which will stand hard usage without distortion or loss of shape. The use of wire screening, or any generally foraminous material, insures that the meat supported by the carrier will be effectively subjected to the action of the heat and smoke during the smoking process.

A chain 16 is connected at its opposite ends, as represented by the numeral 17, to convenient points along the opposite, marginal side edges of the side 14. In order to establish a pressure against a meat piece which is supported by the side 14 and base 15, a presser member 18 is employed and said member is also formed of the same material as constitutes the side and base. The marginal outline of the presser member 18 is generally similar to the base 15, which is preferably rectangular in shape, and from one long side of the member 18 projects a spaced pair of hooks 19 which are employed as a means of detachably and adjustably connecting the member to the side 14 in the manner hereinafter described. Connected to the opposite side of the member 18 is one end of a chain 20 and the opposite end of this chain is provided with a ring 21. Similar rings may be interposed in the length of the chain 20 in spaced relation to each other and to that ring 21 which is connected to the end of said chain, as shown in Fig. 5.

In using my improved carrier, that portion thereof which is comprised by the side 14 and base 15 is rested on a convenient support and a soft piece of meat 22 is placed so that one end thereof is in contact with the base 15, with the side of the meat touching the side 14. The presser member 18 is then hooked to a convenient part of the side 14, depending upon the length of the piece of meat 22, and the free end of the chain 20 is passed through a convenient opening in the base 15 and returned upwardly from said base, as shown in Fig. 1. The intermediate portion of the chain 16 is then passed through one of the rings 21, dependent upon the space relation of the member 18 to the base 15, and the free, intermediate portion of the chain 16 is then pulled tightly to thereby compress the ends of the meat between the base 15 and said member through the medium of the chain 20. The entire assembly is then supported from the horizontal bar 12 of the smokehouse trolley by the chain 16, in which position the total weight will serve to maintain the initial compressive force as applied to the ends of the meat. Fig. 1 shows generally the relation between two adjacent meat-forming carriers when suspended from a common supporting bar, such as a smokehouse trolley, and in this position, it will be readily understood that the ascending smoke and hot gases have free access to all portions of the pieces of meat, so that my improved structure is not characterized by any disadvantages so far as the obtaining of well-smoked and flavored meats are concerned, while at the same time enabling the meat pieces to be sufficiently squared on their respective ends.

In the modification illustrated in Figs. 6 to 9, inclusive, that portion of the carrier which is represented by the side 14 and base 15 is identical with that type of carrier shown in Fig. 1, but certain changes are made in the presser member and the arrangement of chains which are utilized in connection therewith. Specifically, a chain 23 is so connected to the side 14 as to form a closed loop, a portion of the chain passing completely through the side 14 to establish along one surface thereof the two intermediate, chain lengths 24, each of which is of a predetermined length and disposed relatively close to the adjacent side edge of the side 14, as illustrated in Fig. 7. This arrangement of chains establishes two loop portions which project from the opposite surface of the side 14, one loop portion leading from the lower ends of the lengths 24 and the other portion from the upper ends of said lengths, as shown in Fig. 7 also. It will also be noted that, when so arranged, the chain 23 may be moved relatively to the side 14 upwardly and downwardly, as viewed in Fig. 7, which capacity is taken advantage of in the manner hereinafter explained. A second chain 25 is connected at its opposite ends, as represented by the numeral 26, to spaced points on the base 15 and preferably adjacent the exposed corners thereof, thus leaving the portion of the chain between said ends free for the disposition hereinafter described.

The presser member 27 employed in connection with this particular modification is generally similar to the presser member 18 and likewise is provided with a pair of spaced hooks 28 for a similar purpose. The member 27 also carries a pair of arms 29, 29 which extend in opposite directions outwardly from the ends of said member in locations relatively close to that side which is opposite to the side from which extends the hooks 28 (see Fig. 9).

In utilizing this particular type of carrier, the piece of meat 22 is positioned in the manner described in connection with the form shown in Fig. 1, that is, with one end thereof resting on the base 15 and one side in contact with the side 14. The presser member 27 is then connected to the side 14 by means of the hooks 28 at a distance from the base 15 which is determined by the length of the piece of meat 22. That portion of the chain 23 which projects from one surface of the side 14 and which is formed by a continuation of the lower ends of the chain lengths 24 is then laid across the top of the presser member 27, as represented by the numeral 30 in Fig. 7, the chain length 30 looped under the arms 29 and the adjacent surface of the side. Thereafter, that portion of the chain 23 which is formed by a continuation of the upper ends of the chain lengths 24 is then passed through the loop defined by the chain 25 and the base 15. By pulling on the free end of the chain 23, it will be apparent that a compressive force will be applied to the opposite ends of the meat 22 between the base 15 and the presser member 27 through the medium of the chain length 30. The free end of the chain 23 may then be hung from the bar 11, whereupon the weight of the entire assembly will maintain the compressive force which has thus been originally applied to the meat.

In Figs. 10 and 11 is illustrated a third modification of my improved carrier in which the force of gravity is utilized for the purpose of pre-shaping one end of the meat, with the several chains so arranged as to prevent any tendency of the meat to slip from its position in the carrier. In this form, the side 14 and base 15 are identical with the types heretofore described. A chain 31 is connected at its opposite ends, as at 32, 32, to the side 14 and preferably to the side edges thereof. A second chain 33 is also connected at its ends, as at 34, 34, to the exposed edge of the base 15 and preferably adjacent the exposed corners thereof. These chain dispositions create two loop formations which are utilized to retain the meat in position, as will now be described.

The piece of meat 22 is initially rested against the side 14 and base 15 as above described and slightly pressed by hand or with a suitable tool in order to establish a good contact with the base 15 and a resultant squaring of the indicated end. The chain 31 is then passed through the loop formed by the chain 33, whereupon the free end of the chain 31 is pulled as tightly as is necessary without squeezing the meat or otherwise distorting the same, after which the free portion of the chain 31 may be suspended from the bar 11. The arrangement of the chains 31 and 33 is such and their mutual engagement is so effected as to provide a four-arm disposition, represented by the indicated portions of the several chain lengths, which embrace the sides of the meat sufficiently to retain the same in position during the customary handling in the smokehouse. The initial squaring of the lower end of the meat, attained by pressing the meat piece downwardly against the base 15, is retained during the smoking operation by the weight of the meat.

Any of the above modifications provide a structure which is susceptible of convenient and rapid handling in a smokehouse and one which is highly effective for the purpose of squaring the ends of substantially boned meats. Moreover, the nature of the carrier is such that no hindrance is interposed to the adequate smoking of the meat, so that far as this particular phase of the problem is concerned, the use of my improved carriers retains every advantage which is now had in the ordinary suspension or hanging of meats by strings or hooks, while in addition incorporating the important advantage of squaring the ends of the meats and therefore improving their marketing characteristics.

While I have shown one set of elements and combinations thereof for effectuating my improved meat-forming carrier, it will be understood that the same is intended for purpose of illustration only and in nowise to retrict my devices to the exact forms and structures shown, for many changes may be made therein without departing from the spirit of my invention.

I claim:

1. A meat forming carrier for holding substantially boned meat during the smoking operation comprising a foraminous base and side defining a meat-receiving member, a presser member connectible to said side, a flexible device connected to said presser member and looped through said base, and means on said side for applying a pull to the free end of said device whereby the meat piece is compressed between said presser member and base.

2. A meat forming carrier for holding substantially boned meat during the smoking operation comprising a foraminous base and side defining a meat-receiving member, a presser member detachably connectible to said side, a flexible device connected to said presser member and looped through said base, and means on said side for applying a pull to the free end of said device whereby the meat piece is compressed between said presser member and base.

3. A meat forming carrier for holding substantially boned meat during the smoking operation comprising a foraminous base and side defining a meat-receiving member, a presser member substantially hinged to said side, a flexible device connected to said presser member and looped through said base, and means on said side for applying a pull to the free end of said device whereby the meat piece is compressed between said presser member and base.

4. A meat forming carrier for holding substantially boned meat during the smoking operation comprising a foraminous base and side defining a meat-receiving member, a presser member having a detachable hinge connection with said side, a flexible device connected to said presser member and looped through said base, and means on said side for applying a pull to the free end of said device whereby the meat piece is compressed between said presser member and base.

5. A meat forming carrier for holding substantially boned meat during the smoking operation comprising a foraminous base and side defining a meat-receiving member, a presser member connectible to said side, a flexible device connected to said presser member and looped through said base, and means on said side for applying a pull to the free end of said device whereby the meat piece is compressed between said presser member and base and for suspending said carrier for exposure to the smoke and hot gases.

6. A meat forming carrier for holding substantially boned meat during the smoking operation comprising a foraminous base and side defining a meat-receiving member, a presser member connectible to said side and adjustable to different distances from said base, a flexible device connected to said presser member and looped through said base, and means on said side for applying a pull to the free end of said device whereby the meat piece is compressed between said presser member and base.

7. A meat forming carrier for holding substantially boned meat during the smoking operation comprising a foraminous base and side defining a meat-receiving member, a presser member connectible to said side, a chain connected to said presser member and looped through said base, and means on said side for applying a pull to the free end of said chain whereby the meat piece is compressed between said presser member and base.

8. A meat forming carrier for holding substantially boned meat during the smoking operation comprising a foraminous base and side defining a meat-receiving member, a presser member connectible to said side and adjustable to different distances from said base, a chain comprising a plurality of rings connected to said presser member and looped through said base, and a second chain connected to said side and insertable through one of said rings for applying a pull to the free end of said first chain whereby the meat piece is compressed between said presser member and base.

9. A meat forming carrier for holding substantially boned meat during the smoking operation comprising a foraminous base and side defining a meat-receiving member, a presser member connectible to said side, and flexible devices connected to said base, side and presser member mutually engageable for applying a compressive force to the meat piece between said presser member and base.

10. A meat forming carrier for holding substantially boned meat during the smoking operation comprising a foraminous base and side defining a meat-receiving member, a presser member connectible to said side, and flexible devices interconnected between said side, base and presser member so arranged that when tightened, a compressive force is applied to a meat piece between said presser member and base.

11. A meat forming carrier for holding substantially boned meat during the smoking operation comprising a foraminous base and side defining a meat-receiving member, a flexible device connected to said base, and a second flexible device for suspending the carrier and engageable with said first device to retain a piece of meat in position on the carrier.

12. A meat forming carrier for holding substantially boned meat during the smoking operation comprising a foraminous base and side defining a meat-receiving member, a chain connected to said side, and a second chain connected to said base, said chains being engageable to retain a piece of meat on said carrier and the free end of said first chain being utilized as a suspending means whereby all chains are maintained in a taut condition.

13. A meat forming carrier for holding substantially boned meat during the smoking operation comprising a foraminous base and side defining a meat-receiving member, a presser member connectible to said side, a flexible device connected to said base, and means engageable with said presser member, side, and device for applying pressure to said presser member whereby the meat piece is compressed between said presser member and base.

14. A meat forming carrier for holding substantially boned meat during the smoking operation comprising a foraminous base and side defining a meat-receiving member, a presser member connectible to said side, a chain loop connected to said base, and a second chain looped over said presser member and through said side and loop for applying pressure to said presser member whereby the meat piece is compressed between said presser member and base.

15. A meat forming carrier for holding substantially boned meat during the smoking operation comprising a foraminous base and side defining a meat-receiving member, a presser member connectible to said side, a chain loop connected to said base, a second chain looped over said presser member and through said side and loop for applying pressure to said presser member whereby the meat piece is compressed between said presser member and base, and means on said presser member for retaining said second chain in a predetermined position.

16. A meat forming carrier for holding substantially boned meat during the smoking operation comprising a foraminous base and side defining a meat-receiving member, a presser member connectible to said side, a chain loop connected to said base, a second chain looped over said presser member and through said side and loop for applying pressure to said presser member whereby the meat piece is compressed between said presser member and base, and laterally extending arms on the presser member under which said second chain is inserted to maintain the same in a predetermined position.

In testimony whereof, I have subscribed my name.

ALONZO N. BENN.